(12) United States Patent
Zhang et al.

(10) Patent No.: US 6,613,711 B2
(45) Date of Patent: Sep. 2, 2003

(54) CLAY-TITANIUM TETRACHLORIDE CATALYST AND THE PREPARATION THEREOF

(75) Inventors: Xuequan Zhang, Changchun (CN); Feng Yang, Changchun (CN); Haichao Zhao, Changchun (CN)

(73) Assignee: Changchun Institute of Applied Chemistry, Chinese Academy of Sciences, Jilin (CN)

( * ) Notice: Subject to any disclaimer, the term of this patent is extended or adjusted under 35 U.S.C. 154(b) by 22 days.

(21) Appl. No.: 10/066,417

(22) Filed: Jan. 31, 2002

(65) Prior Publication Data

US 2003/0027711 A1 Feb. 6, 2003

(30) Foreign Application Priority Data

Aug. 3, 2001 (CN) ........................................ 01123574 A

(51) Int. Cl.[7] .................................................. B01J 21/16
(52) U.S. Cl. .............................. 502/84; 502/80; 502/62
(58) Field of Search ................................ 502/80, 84, 62

(56) References Cited

U.S. PATENT DOCUMENTS

| | | | | | |
|---|---|---|---|---|---|
| 4,898,987 A | * | 2/1990 | Knifton | ...................... | 568/385 |
| 4,939,301 A | * | 7/1990 | Grice et al. | .................. | 564/477 |
| 5,166,110 A | * | 11/1992 | Brun | ............................ | 502/62 |
| 5,308,811 A | * | 5/1994 | Suga et al. | .................... | 502/62 |
| 5,362,825 A | * | 11/1994 | Hawley et al. | ............. | 526/114 |
| 6,531,552 B2 | * | 3/2003 | Nakano et al. | ............. | 526/127 |

* cited by examiner

Primary Examiner—Tom Dunn
Assistant Examiner—Christina Ildebrando
(74) Attorney, Agent, or Firm—Pennie & Edmonds LLP

(57) ABSTRACT

The present invention provides a clay-titanium tetrachloride catalyst used for the preparation of polyolefine/clay composite materials, comprising: 1) a phyllosilicate; 2) a magnesium compound selected from the group consisting of $MgCl_2$, $Mg(OR)_2$ and $MgR_2$, wherein R is an alkyl group having 1–8 carbon atoms; 3) an aliphatic alcohol which is capable of dissolving the magnesium compound; 4) titanium tetrachloride $TiCl_4$; and optionally 5) an electron-donor reagent selected from the group consisting of an aromatic ester and an aromatic group substituted or cycloalkyl group substituted alkoxy silane. The present invention also provide a method for the prepare of the catalyst. The nanocomposite materials obtained by using the catalyst have tensile strength of 32–50 MPa and Vicat temperature of 131–220° C.

16 Claims, No Drawings

CLAY-TITANIUM TETRACHLORIDE CATALYST AND THE PREPARATION THEREOF

FIELD OF THE INVENTION

The present invention relates to a clay-titanium tetrachloride catalyst and the method for preparation of the catalyst.

BACKGROUND OF THE INVENTION

Polymer/layered silicate nanocomposite is a new excitement in the field of polymeric materials. Relatively small amount ($\leq 5$ wt %) of nanometer-sized dispersed clay layers in the polymer matrix not only significantly raises the mechanical and thermal properties of the material, but also bestows on the materials additional benefits, such as reduced gas permeability, increased dimensional stability and enhanced flame retardancy, without substantially raising the density or damaging light transmission of the corresponding neat resin. Example of such disclosures are (1) E. P. Giannelis, *Adv. Mater.* 1996, 8, 29. (2) Z. Wang, T. J. Pinnavaia, *Chem. Mater.* 1998, 10, 3769. (3) Y. Kojima, A. Usuki, M. Kawasumi, A. Okada, Y. Fukushima, T. Kurauchi, O. Kamigaito, *J. Mater. Res.* 1993, 8, 1185.

The great economic values of polyolefin nanocomposites are foreseen in potential applications in various areas; nevertheless, the preparation of such composites is still in its exploration stage. Melting intercalation of an organically modified silicate with polyolefin is an approach having been receiving intensive attention, the steps of modifying the silicate, polarizing the polyolefin or its oligomers and the chemical or physical deterioration of the virgin components during mixing process may offset the benefits of the silicate to some extent. In situ polymerization is an alternative approach for preparation of polyolefin nanocomposites, which involves intercalation of a silicate by a metallocene or Ziegler-Natta catalyst, followed by polymerization of an olefin.

In situ polymerization overrides entropic and enthalpic barriers associated with intercalating nonpolar polyolefin with polar silicates; the strongly polar nature of layered silicate is still to be considered for mechanism with metallocene or Ziegler-Natta catalyst. The seemingly tolerable Brookhart catalyst toward polarity and moisture was found to have a quite low activity in ethylene intercalation polymerization (J. S. Bergman, H. Chen, E. P. Giannelis, M. G. Thomas, G. W. Coates, *Chem. Commun.* 1999, 2179.). To protect the active sites from poisonous inner surface of the silicate, O'Hare and coworkers first treated the layered silicate with a large amount of MAO, and then immobilized the metallocene catalyst on the MAO modified silicate. Unfortunately, in situ polymerization with this catalyst gave only propylene oligomers in low activity [(1) J. Tudor, L. Willington, D. O'Hare, B. Royan, *Chem. Commun.* 1996, 2031. (2) J. Tudor, D. O'Hare, *Chem. Commun.* 1997, 603.]. WO 99/47589 disclosed a method for preparation of polyolefine nanocomposite by in-situ polymerization. The polyethylene nanocomposite materials thus obtained possess both high tensile strength and high modulus. The method comprises the steps of: 1) dispersing layered silicate clay with water, and then removing water by freeze-drying to lower the polarity of the clay; 2) treating the clay thus obtained with a large amount of methyl aluminoxane (MAO) and removing the excess of MAO by washing; 3) adding metallocene catalyst to the MAO treated clay in heptane; 4) allowing ethylene to polymerize. The method has the following drawbacks: 1) freeze-drying treatment of clay is a time-consuming and expensive process; 2) consumption of large amount of expensive MAO is required, since [MAO]/[Ti] ratio is in the range of 1000~3000; 3) the activity of metallocene catalyst is greatly reduced.

DISCLOSURE OF THE INVENTION

It is one object of the present invention to provide a clay-titanium tetrachloride catalyst used for the preparation of polyolefine/clay composite materials.

It is another object of the present invention to provide a method for the preparation of the clay-titanium tetrachloride catalyst of the present invention.

The present invention provides a method for the preparation of polyolefine/clay composite materials by using the catalyst of the present invention. In this method, Ziegler-Natta catalyst is supported within the layers of layered silicate clay and the olefin is directly polymerized into polyolefine nanocomposite material.

The present invention provides a clay-titanium tetrachloride catalyst used for the preparation of polyolefine/clay composite materials, comprising the components of:

1) a phyllosilicate, including smectite clays, such as sodium montmorillonite and calcium montmorillonite, hectorite clay etc. Both original and chemical or physical modified clays can be used.

2) a magnesium compound, such as $MgCl_2$, $Mg(OR)_2$ or $MgR_2$, wherein R is an alkyl group having 1–8 carbon atoms;

3) an alcohol compound which is capable of dissolving the magnesium compound, such as aliphatic alcohols having 1–8 carbon atoms, for example, methanol, ethanol, propanol, butanol, isopropanol and/or isobutanol;

4) titanium tetrachloride $TiCl_4$; and optionally 5) an electron-donor reagent selected from the group consisting of aromatic esters and aromatic group substituted or cycloalkyl group substituted alkoxy silane, such as ethyl benzoate, butyl benzoate, diethyl phthalate, dibutyl phthalate, diphenyl dimethoxy silane and/or triphenyl methoxy silane.

The present invention further provide a method for the preparation of the clay-titanium tetrachloride catalyst, comprising the steps of:

1) dissolving a magnesium compound as defined above in an aliphatic alcohol to a concentration of 0.1 g–10 g/100 ml to obtain a transparent and stable solution, and adding an electron-donor reagent with a mole ratio of [Mg]/[electron-donor reagent] at 1:1 to 1000:1 when the electron-donor reagent is used;

2) adding a clay at an amount of 0.01–10 g per millimole magnesium compound into the aliphatic alcohol solution of the magnesium compound with stirring;

3) filtering off the aliphatic alcohol and removing the residual aliphatic alcohol at reduced pressure or by alcoholysis using chemical method (1–10 mmol/g solid alkyl aluminum compound can be used for the alcoholysis reaction);

4) adding $TiCl_4$ into the solution with stirring to obtain a [Ti]/[Mg] molar ratio in the range of 1/10 to 1000/1;

5) filtering the solution and washing the solid powder thus obtained with an inert solvent until no transition metal ion is detectable in the filtrate, and drying the powder.

The catalyst system of this invention uses alkyl aluminum compound with the formula of $AlR_nCl_{3-n}$ as the cocatalyst or alcoholysis reagent, wherein R is an alkyl group having 2–8 carbon atoms and n is an integral of 2 or 3.

The preparation of polyolefine/clay composite materials by using the catalyst of the present invention can carried out under slurry polymerization conditions. Saturated alkane or cycloalkane is used as the solvent. [Al]/[Ti] mole ratio is in the range of 3 to 300 and the polymerization temperature is −30~90° C. When polypropylene nanocomposite material is prepared, the catalyst should contain inner electron-donor reagent and/or outer electron-donor reagent. When polyethylene nanocomposite material is prepared, electron-donor reagent can be used or not be used. The tensile strength of nanocomposite materials thus obtained is 32–50 Mpa, and the Vicat temperature is 131–220° C.

The catalyst system of the present invention could be used to prepare nanocomposite materials of polyethylene, polypropylene, other polyolefins and their copolymers, and can be used in slurry polymerization, gas phase polymerization and bulk polymerization processes.

This invention eliminated the requirements to use the expensive freeze-drying process and expensive MAO. Therefore the costs are very much reduced compared with that using metallocene catalyst systems. In addition, the processes for synthesis and polymerization are similar to those currently used in the industrial production of polyolefine, thus it would be much easier to be industrialized. In comparison with melt blend method, the method of the present invention uses clay-containing Ziegler-Natta catalyst to polymerize olefine directly into polyolefine nanocomposite materials, and by this way, time consuming and tedious post-processing and/or post-treatment can be avoided.

EXAMPLES

Example 1

Under the protection of $N_2$ atmosphere, 2.5 g $MgCl_2$ was added to 100 ml refined butanol at 60° C., and the solution was stirred for 2 hours to obtain a homogeneous transparent solution. The insoluble matters were removed by filtration. To the $MgCl_2$-butanol solution, 10 g of $Na^+$ montmorillonite calcined at 400° C. was added. The solution was stirred at 60° C. for another 2 hours and the excess butanol was filtered off. The solid product was washed with 50 ml dried hexane for 3 times. To the reaction system, 100 ml dried hexane was added. Then 10 mmol Al (i-$C_4H_9$)$_3$ was added with vigorous stirring. The reaction was allowed to proceed for 30 minutes, then the reactants were filtered and washed with 50 ml dried hexane for 3 times. 100 ml $TiCl_4$ was added to the reaction system, and the system was stirred for 2 hours at 80° C. Then excess $TiCl_4$ was filtered off. The solid product thus obtained was washed 5 times with 50 ml dried hexane, and then dried under reduced pressure. Finally, a solid catalyst powder was obtained. The content of titanium and that of magnesium of the catalyst powder were determined to be 1.98 wt % and 7.5 wt %, respectively, by using ICP method.

Under $N_2$ atmosphere, to a 200 ml dried and deoxygenated glass reactor equipped with mechanical stirrer, 150 ml dried hexane was added. Then, under stirring, 10 mmol Al($C_2H_5$)$_3$ and 0.2 mmol solid catalyst was added. The molar ratio of [Al]/[Ti] was 50. Ethylene gas was introduced and the pressure was maintained at 50 mm Hg. The reactor was put into a water bath at 50° C. to start polymerization. After polymerization was initiated for 60 minutes, 2 ml ethanol was added to terminate the reaction. The polymerized product was washed with excess ethanol, then filtered and dried. Montmorillonite content of the polymer thus obtained was 3.6 wt %. The X-ray diffraction pattern of the montmorillonite revealed that peak characteristic of layered silicate at 2θ=8.9° disappeared, indicating that layers of montmorillonite were peeled off. The molecular weights of the polymer as determined by gel permeation chromatography with polystyrene as the standard were as follows: $M_n$=325, 343, $M_w$=1, 125, 209, $M_w/M_n$=3.46.

Vicat softening temperature of the polymer determined at a heating rate of of 5° C./min was 220.0° C. Tensile strength of the polymer as determined with an electronic tester at a drawing speed of 50 mm/min. was 49.5 MPa. Young's modulus was 794 MPa.

Comparative Example 1

The process of Example 1 was carried out, except that no montmorillonite was used in the preparation of the catalyst. The catalyst thus prepared has a titanium content of 1.5 wt %.

The polymerization process of Example 1 was carried out, except that the catalyst obtained in this Comparative Example was used. The polymer thus obtained have Vicat softening temperature of 122.9° C., tensile strength of 30.9 MPa and Young's modulus of 562 MPa, as measured under the same conditions.

Example 2

Under the protection of $N_2$ atmosphere, 2.5 g $MgCl_2$ was added to 100 ml refined methanol at 60° C., and the solution was stirred for 2 hours to obtain a homogeneous transparent solution. The insoluble matters were removed by filtration. To the $MgCl_2$-butanol solution, 10 g of $Na^+$ montmorillonite calcined at 400° C. was added. The solution was stirred at 60° C. for another 2 hours and the excess methanol was filtered off. The reacting system was vacuum dried at 60° C. for 2 hours. To the reacting system, 100 ml $TiCl_4$ was added and the solution was stirred for 2 hours at room temperature. After the excess $TiCl_4$ was filtered off, the solid product was washed 5 times with 50 ml dried hexane, and then was dried under reduced pressure. Finally, a solid catalyst powder was obtained. The titanium content of the catalyst powder were 1.82 wt % as determined by using ICP method.

Al($C_2H_5$)$_3$ was used as cocatalyst, with the molar ratio of [Al]/[Ti]=100. Polymerization reaction and analysis were carried out similarly to that of Example 1. The montmorillonite content of the polymer thus obtained was 0.5 wt %. The Vicat softening temperature of the polymer was 138.8° C., tensile strength was 44.3 MPa and Young's modulus was 664 MPa

Example 3

The polymerization process of Example 1 was carried out except that the catalyst of Example 2 was used, the molar ratio of [Al ($C_2H_5$)$_3$]/[Ti] was 3, heptane was used as the solvent, and the polymerization temperature was 90° C. The polymer thus obtained has a montmorillonite content of 4.87 wt %, Vicat softening temperature of 131.1° C. and Young's modulus of 1020 MPa.

Example 4

The polymerization process of Example 1 was carried out except that the catalyst of Example 2 was used, the molar ratio of [Al ($C_2H_5$)$_3$]/[Ti] was 300, and the polymerization temperature was −30° C. The polymer thus obtained has a montmorillonite content of 3.85 wt %, Vicat softening temperature of 202.1° C. and Young's modulus of 1030 MPa.

Example 5

Under the protection of $N_2$ atmosphere, 100 ml refined hexane, 5 g montmorillonite and 12.5 mol $Mg(C_4H_9)_2$ were added into a 250 ml dried round bottom flask. The solution was stirred for 2 hours at 60° C. The solid product was filtered off and was then washed with 50 ml dried hexane for 3 times. To the reacting system, another 100 ml dried hexane and then 0.1 mol $TiCl_4$ was added. The solution was stirred for 2 hours at 60° C. The solid product was washed 5 times with hexane, and dried for future use. The titanium content of the catalyst powder was 1.7 wt % as determined by using ICP method.

By using $Al(C_2H_5)_3$ as cocatalyst with the molar ratio of [Al]/[Ti] at 30, the process of Example 1 was carried out. The polymer thus obtained has a montmorillonite content of 4.76 wt %, Vicat softening temperature of 131.1° C. and Young's modulus of 957 MPa.

Example 6

Under the protection of $N_2$ atmosphere, 2.2 g $Mg(OCH_3)_2$ was added into 100 ml refined ethanol and the solution was stirred for 2 hours at 60° C. to form a homogeneous transparent solution. To this solution, 10 g $Na^+$ montmorillonite calcined at 400° C. was added. The stirring was continued for 2 hours and the excess ethanol was filtered off. The solid product obtained was washed with 50 ml dried hexane for 3 times. To the reaction system, 100 ml dried hexane was added. Then 10 mmol $Al(i-C_2H_5)_2$ was added with vigorous stirring. The reaction was allowed to proceed for 30 min, then the solution was filtered and washed 3 times with 50 ml dried hexane. To the reaction system, 100 ml $TiCl_4$ was added, stirred for 2 hours at 80° C. After the excess $TiCl_4$ was filtered off, the solid product was washed with dried hexane for 5 times, then dried at reduced pressure and a catalyst powder was finally obtained. The titanium content of the catalyst powder was 2.1 wt % as determined by using ICP method.

The polymerization reaction of Example 1 was carried out, a polymer was obtained which has a montmorillonite content of 3.65 wt % and a Vicat softening temperature of 131.2° C.

Example 7

The process of Example 6 was carried out except that $Mg(OCH_3)_2$ was replaced by $Mg(OC_2H_5)_2$. The catalyst powder has a titanium content of 1.8 wt % as determined by ICP method.

The polymerization reaction of Example 1 was carried out, a polymer was obtained which has a montmorillonite content of 3.02 wt % and a Vicat softening temperature of 131.5° C.

Example 8

The process of Example 6 was carried out except that $Mg(OCH_3)_2$ was replaced by $Mg(OC_4H_9)_2$. The catalyst powder has a titanium content of 2.0 wt % as determined by ICP method.

The polymerization reaction of Example 1 was carried out, a polymer was obtained which has a montmorillonite content of 3.83 wt % and a Vicat softening temperature of 131.3° C.

Example 9

Under the protection of $N_2$ atmosphere, 0.1 g (1 mmol) of $Mg(OCH_3)_2$ was added into 100 ml refined propanol and the solution was stirred for 2 hours at 60° C. to form a homogeneous transparent solution. To this solution, 10 g $Na^+$ montmorillonite calcined at 400° C. was added. The solution was continuously stirred for 2 hours and the excess propanol was filtered off. The solid product obtained was washed with 50 ml dried hexane for 3 times. To the reacting system, 100 ml dried hexane was added. Then 10 mmol $Al(i-C_4H_9)_2Cl$ was added with vigorous stirring. The reaction was allowed to proceed for 30 min., then the solution was filtered and washed 3 times with 50 ml dried hexane. To the reacting system, 110 ml $TiCl_4$ was added, and the solution was stirred for 2 hours at 80° C. After the excess $TiCl_4$ was filtered off, the solid product obtained was washed with dried hexane for 5 times, then dried at reduced pressure and a catalyst powder was finally obtained. The titanium content of the catalyst powder was 0.21 wt % as determined by ICP method.

The polymerization reaction of Example 1 was carried out, a polymer was obtained which has a montmorillonite content of 4.68 wt % and a Vicat softening temperature of 131.9° C.

Example 10

Under the protection of $N_2$ atmosphere, 10 g (11 mmol) of $Mg(OCH_3)_2$ was added into 100 ml refined propanol. The solution was stirred for 2 hours at 60° C. to form a homogeneous transparent solution. To this solution, 0.11 g $Na^+$ montmorillonite calcined at 400° C. was added. The solution was continuously stirred for 2 hours at 60° C. The excess propanol was filtered off and the solid product obtained was washed with 50 ml dried hexane for 3 times. To the reaction system, 100 ml dried hexane was added. Then 100 mmol Al $(i-C_4H_9)_2Cl$ was added with vigorous stirring. The reaction was allowed to proceed for 30 min., then the solution was filtered and washed 3 times with 50 ml dried hexane. To the reaction system, 100 ml dried hexane and 0.12 ml (1.1 mmol) $TiCl_4$ were added, and the solution was stirred for 2 hours at 80° C. After filtration, the solid product was washed with dried hexane for 5 times, then dried at reduced pressure and a catalyst powder was finally obtained. The titanium content of the catalyst powder was 0.37 wt % as determined by ICP method.

The polymerization reaction of Example 1 was carried out, a polymer was obtained which has a montmorillonite content of 0.16 wt % and a Vicat softening temperature of 149.5° C.

Example 11

Under the protection of $N_2$ atmosphere, 2.5 g $MgCl_2$ was added into 100 ml refined isobutanol and the solution was stirred for 2 hours at 60° C. to form a homogeneous transparent solution. The insoluble matters were removed by filtration. To this solution, 10 g $Na^+$ montmorillonite calcined at 400° C. and 2 ml ethyl benzoate were added. The solution was continuously stirred for 2 hours at 60° C., and then the excess isobutanol was filtered off. The solid product obtained was washed with 50 ml dried hexane for 3 times. To the reaction system, 100 ml dried hexane was added. Then 10 mmol Al $(i-C_4H_9)_3$ was added with vigorous stirring. The reaction was allowed to proceed for 30 min., then the solution was filtered and washed 3 times with 50 ml dried hexane. To the reaction system, 100 ml $TiCl_4$ was added, and the solution was stirred for 2 hours at 80° C. After the excess $TiCl_4$ was filtered off, the solid product was washed with dried hexane for 5 times, then dried at reduced pressure and a catalyst powder was finally obtained. The titanium content of the catalyst powder was 1.57 wt % as determined by ICP method.

The process of Example 1 was carried out except that propylene was used as the polymerizing gas. The polymer thus obtained has a montmorillonite content of 2.53 wt % and heptane-insoluble substance content was 84 wt %. Vicat temperature of the polymer thus obtained was 149.9° C.

Example 12

Under the protection of $N_2$ atmosphere, 0.95 g (10 mmol) $MgCl_2$ was added into 100 ml refined butanol. The solution was stirred for 2 hours at 60° C. to form a homogeneous transparent solution. The insoluble substances were filtered off. To this solution, 10 g $Na^+$ montmorillonite calcined at 400° C. and 10 mmol butyl benzoate were added. The solution was continuously stirred for 2 hours at 60° C. The excess butanol was filtered off and the solid product obtained was washed with 50 ml dried hexane for 3 times. To the reaction system, 100 ml dried hexane was added. Then 10 mmol Al $(i-C_4H_9)_3$ was added with vigorous stirring. The reaction was allowed to proceed for 30 min., then the solution was filtered and washed 3 times with 50 ml dried hexane. To the reaction system, 100 ml $TiCl_4$ was added and stirred for 2 hours at 80° C. After the excess $TiCl_4$ was filtered off, the solid product was washed with dried hexane for 5 times, then dried at reduced pressure and a catalyst powder was finally obtained. The titanium content of the catalyst powder was 0.75 wt % as determined by ICP method.

The process of Example 1 was carried out except that propylene was used as the polymerizing gas. The polymer thus obtained has a montmorillonite content of 4.53 wt % and the content of heptane-insoluble substance was 93 wt %. Vicat temperature of the polymer thus obtained was 154.9° C.

Example 13

Under the protection of $N_2$ atmosphere, 9.5 g (100 mmol) $MgCl_2$ was added into 100 ml refined butanol. The solution was stirred for 2 hours at 60° C. to form a homogeneous transparent solution. The insoluble substances were filtered off. To this solution, 10 g $Na^+$ montmorillonite calcined at 400° C. and 0.1 mmol diethyl phthalate were added. The solution was continuously stirred for 2 hours at 60° C. The excess butanol was filtered off and the solid product obtained was washed with 50 ml dried hexane for 3 times. To the reaction system, 100 ml dried hexane was added. Then 10 mmol Al $(i-C_4H_9)_3$ was added with vigorous stirring. The reaction was allowed to proceed for 30 min., then the solution was filtered and washed 3 times with 50 ml dried hexane. To the reaction system, 100 ml $TiCl_4$ was added, and the solution was stirred for 2 hours at 80° C. After the excess $TiCl_4$ was filtered, the solid product was washed with 50 ml dried hexane for 5 times, then dried at reduced pressure and a catalyst powder was finally obtained. The titanium content of the catalyst powder was 2.76 wt % as determined by ICP method.

The process of Example 1 was carried out except that propylene was used as the polymerizing gas. The polymer thus obtained has a montmorillonite content of 1.03 wt % and the content of heptane-insoluble substance was 75 wt %. Vicat temperature of the polymer thus obtained was 141.4° C.

Example 14

The process of Example 11 was carried out except that ethyl benzoate was replaced by dibutyl phthalate. The titanium content of the catalyst powder was 1.28 wt % as determined by ICP method.

The process of Example 1 was carried out except that propylene was used as the polymerizing gas. The polymer thus obtained has a montmorillonite content of 2.05 wt % and the content of heptane-insoluble substance was 89 wt %. Vicat temperature of the polymer thus obtained was 152.1° C.

Example 15

The process of Example 11 was carried out except that 0.09 mmol diphenyl dimethoxy silane was added as outer electron-donor reagent in the polymerization. The polymer thus obtained has a montmorillonite content of 2.34 wt % and the content of heptane-insoluble substance was 92 wt %. Vicat temperature of the polymer thus obtained was 154.9° C.

What is claimed is:

1. A clay-titanium tetrachioride catalyst, comprising:
   1) a phyllosilicate;
   2) a magnesium compound selected from the group consisting of $MgCl_2$, $Mg(OR)_2$ and $MgR_2$, wherein R is an alkyl group having 1–8 carbon atoms;
   3) an aliphatic alcohol which is capable of dissolving the magnesium compound; and
   4) titanium tetrachloride $TiCl_4$.

2. The catalyst according to claim 1, further comprising an electron-donor reagent selected from the group consisting of an aromatic ester and an aromatic group substituted or cycloalkyl group substituted alkoxy silane.

3. The catalyst according to claim 2, wherein the aromatic ester is selected from the group consisting of ethyl benzoate, butyl benzoate, diethyl phthalate and dibutyl phthalate.

4. The catalyst according to claim 2, wherein the aromatic group substituted or cycloalkyl group substituted alkoxy silane is selected from the group consisting of diphenyl dimethoxy silane and triphenyl methoxy silane.

5. The catalyst according to claim 1, wherein the phyllosilicate includes smectite clays.

6. The catalyst according to claim 1, wherein the phyllosilicate is selected from the group consisting of sodium montmorillonite, calcium montmorillonite and hectorite clay.

7. The catalyst according to claim 1, wherein the aliphatic alcohol has 1–8 carbon atoms.

8. The catalyst according to claim 1, wherein the aliphatic alcohol is selected from the group consisting of methanol, ethanol, propanol, butanol, isopropanol and isobutanol.

9. A method for preparing a clay-titanium tetrachloride catalyst, comprising the steps of:
   1) dissolving a magnesium compound selected from the group consisting of $MgCl_2$, $Mg(OR)_2$ and $MgR_2$, wherein R is an alkyl group having 1–4 carbon atoms, in an aliphatic alcohol to a concentration of 0.1 g–10 g/ 100 ml;
   2) adding a phyllosilicate to an amount of 0.01–10 g per millimole magnesium compound into the aliphatic alcohol solution of the magnesium compound with stirring;

3) filtering off the aliphatic alcohol and removing the residual aliphatic alcohol at reduced pressure or by alcoholysis using chemical method 4) adding $TiCl_4$ into the solution with stirring to obtain a [Ti]/[Mg] molar ratio in the range of 1/10 to 1000/1;

5) filtering the solution and washing the solid powder thus obtained with an inert solvent until no transition metal ion is detectable in the filtrate, and drying the powder.

10. The method according to claim 9, wherein the step 1) further comprising adding an electron-donor reagent selected from the group consisting of an aromatic ester and an aromatic group substituted or cycloalkyl group substituted alkoxy silane with a mole ratio of [Mg]/[electron-donor reagent] at 1:1 to 1000:1.

11. The method according to claim 10, wherein the aromatic ester is selected from the group consisting of ethyl benzoate, butyl benzoate, diethyl phthalate and dibutyl phthalate.

12. The method according to claim 10, wherein the aromatic group substituted or cycloalkyl group substituted alkoxy silane is selected from the group consisting of diphenyl dimethoxy silane and triphenyl methoxy silane.

13. The method according to claim 9, wherein the aliphatic alcohol has 1–8 carbon atoms.

14. The method according to claim 9, wherein the aliphatic alcohol is selected from the group consisting of methanol, ethanol, propanol, butanol, isopropanol and isobutanol.

15. The method according to claim 9, wherein the alcoholysis is carried out by using an alkyl aluminum compound of the formula of $AlR_nCl_{3-n}$, wherein R is an alkyl group having 2–8 carbon atoms and n is an integral of 2 or 3.

16. A clay-titanium tetrachloride catalyst system used for the preparation of polyolefine/clay composite materials, comprising (1) a clay-titanium tetrachloride catalyst, comprising (a) a phyllosilicate, (b) a magnesium compound selected from the group consisting of $MgCl_2$, $Mg(OR)_2$ and $MgR_2$, wherein R is an alkyl group having 1–8 carbon atoms, (c) an aliphatic alcohol which is capable of dissolving the magnesium compound, and (d) titanium tetrachloride $TiCl_4$; and (2) an alkyl aluminum compound of the formula of $AlR_nCl_{3-n}$ as the cocatalyst, wherein R is an alkyl group having 2–8 carbon atoms and n is an integral of 2 or 3.

* * * * *